United States Patent
Christinsen et al.

(10) Patent No.: US 8,066,486 B2
(45) Date of Patent: Nov. 29, 2011

(54) METHOD AND APPARATUS FOR VIBRATION-BASED AUTOMATIC CONDITION MONITORING OF A WIND TURBINE

(75) Inventors: Axel Juhl Christinsen, Haderslev (DK); Klaus Gram-Hansen, Haderslev (DK); Troels Kildemoes Moeller, Hurup Thy (DK)

(73) Assignee: Siemens Aktiengesellschaft, Munich (DE)

( * ) Notice: Subject to any disclaimer, the term of this patent is extended or adjusted under 35 U.S.C. 154(b) by 552 days.

(21) Appl. No.: 12/315,309

(22) Filed: Dec. 2, 2008

(65) Prior Publication Data

US 2009/0162186 A1    Jun. 25, 2009

(30) Foreign Application Priority Data

Dec. 19, 2007  (EP) .................... 07024657

(51) Int. Cl.
| | |
|---|---|
| F01D 5/00 | (2006.01) |
| F01D 25/00 | (2006.01) |
| B63H 1/00 | (2006.01) |
| B63H 3/00 | (2006.01) |
| B63H 5/00 | (2006.01) |
| B63H 7/00 | (2006.01) |
| B64C 11/00 | (2006.01) |
| B64C 27/00 | (2006.01) |
| F03B 3/12 | (2006.01) |
| F04D 29/00 | (2006.01) |

(52) U.S. Cl. ............. 416/145; 416/35; 416/144; 415/15; 290/44

(58) Field of Classification Search .................... 416/35, 416/144, 145, 204 R, 500; 415/1, 15; 367/13; 290/44, 55; 324/76.13, 207.12, 318
See application file for complete search history.

(56) References Cited

U.S. PATENT DOCUMENTS

| | | | | |
|---|---|---|---|---|
| 5,219,454 A | * | 6/1993 | Class | 416/145 |
| 6,320,272 B1 | * | 11/2001 | Lading et al. | 290/44 |
| 6,525,518 B1 | * | 2/2003 | Garnaes | 324/76.13 |
| 6,966,754 B2 | * | 11/2005 | Wobben | 416/61 |
| 7,330,396 B2 | * | 2/2008 | Wu | 367/13 |
| 7,819,624 B2 | * | 10/2010 | Bonnet | 415/119 |
| 2005/0096873 A1 | * | 5/2005 | Klein | 702/184 |

* cited by examiner

Primary Examiner — Chris Chu

(57) ABSTRACT

Method and apparatus for vibration-based automatic condition monitoring of a wind turbine, comprising the steps of: determining a set of vibration measurement values of the wind turbine; calculating a frequency spectrum of the set of vibration measurement values; calculating a cepstrum of the frequency spectrum; selecting at least one quefrency in the cepstrum, and detecting an alarm condition based upon an amplitude of the cepstrum at the selected quefrency, and a wind turbine therefor.

20 Claims, 5 Drawing Sheets

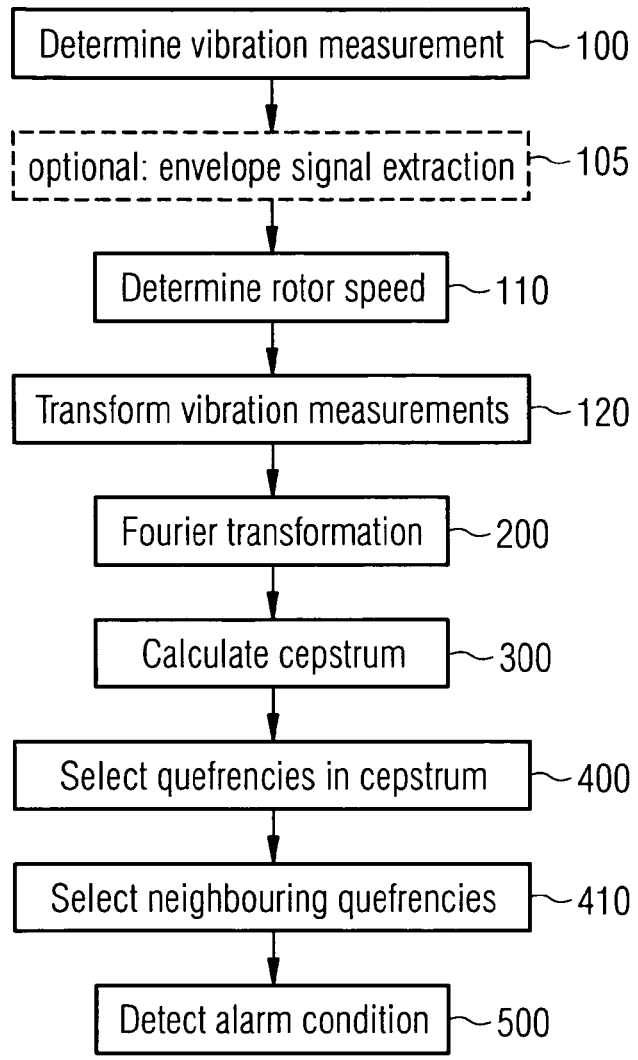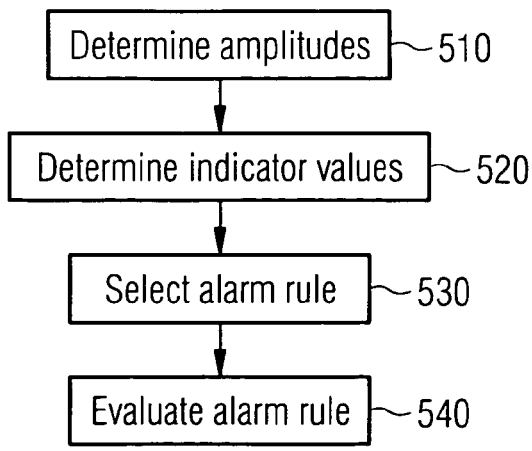

METHOD AND APPARATUS FOR VIBRATION-BASED AUTOMATIC CONDITION MONITORING OF A WIND TURBINE

CROSS REFERENCE TO RELATED APPLICATIONS

This application claims the benefits of European application No. 07024657.4 filed Dec. 19, 2007 and is incorporated by reference herein in its entirety.

FIELD OF INVENTION

The invention relates to a method and an apparatus for vibration-based automatic condition monitoring of a wind turbine, and a wind turbine therefor.

BACKGROUND OF THE INVENTION

For detecting particular conditions in mechanical systems, automatic condition monitoring systems are known which measure and analyse vibrations occurring in the mechanical system. In order to provide reliable monitoring with high safety and a minimum number of false alarms, which could occur due to difficulties in clearly distinguishing between fault frequencies background noise and/or random frequency peaks, it is desirable to optimize the accuracy of the employed automatic evaluation methods in such systems.

Automatic vibration monitoring systems of the state of the art are typically based on one of the following approaches:

A very common approach is to perform rms (root mean square)-measurement pursuant to ISO 10816. Here, the rms typical at a frequency band of 10 to 10000 Hz is calculated, thus obtaining a scalar value that can be continuously compared to a specified threshold level. However, detecting irregular behaviour of the system that has been present initially is not supported by this approach, and neither can the type of damage be characterized in detail.

Another approach is to define a plurality of different rms-bands located at frequencies of particular interest. For instance, frequency spectra such as obtained from FFTs (fast Fourier transforms) or envelope FFTs on envelopes can be used as input data, and the output result is a scalar value for each of the defined bands, which can be compared to threshold levels. Here, damages can be detected at a rather early stage.

However, this approach does not provide for reliable separation of frequencies that lie close to another, so that neighbouring effects significantly impair the reliability of results and thus the applicability of such systems. Further, this approach suffers from a significant sensitivity to variations in background noise or randomly occurring signals in significant frequency bands. Consequently, these systems may produce false alarms and thus provide only a limited specificity. Moreover, such systems typically provide unsatisfactory results in environments where the amplitude level of a fault vibration signature is about equal to the amplitude level of the general background noise of the system.

A further approach is to compare frequency spectra to alarm masks. Such alarm masks can be defined based on reference spectra at the run-in of the mechanical system. Here, typically one or more alarm masks are applied to the reference spectrum. As soon as a mechanical irregularity occurs, such as tooth damages of a gear, sidebands will be produced that pass through the mask and trigger an alarm.

While this approach provides for a fault detection at an even earlier stage than the approach discussed before, it generally suffers from the same limitations as that approach.

A still further approach is proposed in published patent application EP 1 548 419 A1. Here, it is proposed to apply a cepstrum analysis to a frequency spectrum in order to diagnose irregular behaviour of a bearing unit of a railway vehicle axle.

However, such an approach requires a significant extra effort in data processing due to its particular result form. Also, the evaluation of amplitudes in this approach is difficult to reproduce. Here, the provided amplitudes are still less representative than with a plain frequency spectrum.

The limitations of the approaches as described above are of particular significance in automated condition monitoring of wind turbines, particularly of gears or gear boxes of wind turbines. In a wind turbine, there is a number of different vibration components. While some of these components are relevant for monitoring, others are not. Particularly for tooth damages in a planet stage in a wind turbine gearbox, a vibration signal originating from an irregularity is of a low energy content, as compared to the energy content of signals of properly working components or background noise signals. Also in the frequency domain, the signal of any particular of the multitude of the monitored components appears rather mixed with signals of the other components, and also with general background noise. Particularly with advanced monitoring scenarios in wind turbines comprising a multitude of components with similar characteristic vibration frequencies, neighbouring effects are likely to occur.

SUMMARY OF INVENTION

It is therefore an object of the present invention to provide a method and an apparatus for vibration-based automatic condition monitoring of a wind turbine which provides for reliable monitoring even under the particular conditions that are typical of wind turbines, while at the same time avoiding the limitations of the state of the art, as well as a wind turbine therefor.

This object is achieved by the subjects of the claims.

The invention according to the claims teaches a method for vibration-based automatic condition monitoring of a wind turbine, comprising the steps of: determining a set of vibration measurement values of the wind turbine; calculating a frequency spectrum of the set of vibration measurement values; calculating a cepstrum of the frequency spectrum; selecting at least one first quefrency in the cepstrum, and detecting an alarm condition based upon an amplitude of the cepstrum at the selected quefrency. Moreover the detection of a damage may additionally be based on the existence of a signature, e.g. with a significant amplitude above the noise level or the pree of rhamonics.

By calculating and analysing the cepstrum of the frequency spectrum of the vibrations measured in the wind turbine, the configuration of the present invention generates highly precise and trendable values. In wind turbine environments, where vibrations due to irregular system behaviour are particularly difficult to detect, the application of the cepstrum proves to produce good monitoring results.

Using the cepstrum in wind turbines thus overcomes the generally accepted view that cepstrum analysis is not appropriate for automatic condition monitoring in such demanding environments, its limitations being generally acknowledged as discussed above.

For example, in the discussed system of the state of the art, in which the bearing of an axle of a railway vehicle is monitored, cepstrum analysis is merely applied to a system where a single source of vibration can be clearly distinguished, and where vibrations of regular and irregular behaviour manifest themselves in a characteristic manner. In contrast, wind turbines comprise a multitude of monitored vibration sources, most of which share similar characteristics and are located at closely neighbouring frequency ranges.

Thus, in spite of the monitoring of a wind turbine being much more complex than monitoring a bearing of a railway vehicle axle, the present invention proposes to invest the additional technical effort to calculate the cepstrum, and thus surprisingly provides for its reliable and precise wind turbine monitoring results.

Further embodiments of this aspect of the invention can be characterized by the features provided in the claims.

An embodiment of the method, where the monitored wind turbine is of variable rotor speed, further comprises the steps of determining the rotor speed of the wind turbine, and transforming the set of vibration measurement values according to the determined speed.

Thus, the present invention can be used with wind turbines having a constant rotor speed and wind turbines with variable rotor speeds, for instance with wind turbines where the rotor rotational speed is controlled with braking or pitch control. By transforming the set of measurement values, the remaining steps of transformation and analysis can be performed without alterations.

In an embodiment, the set of vibration measurement values of the wind turbine comprise measurement values of vibrations of at least one gear of the wind turbine.

The set of vibration measurement values of the wind turbine may also comprise measurement values of vibrations of a gearbox of the wind turbine, and/or can comprise, or consist of, a time series of vibration measurement values. In such complex mechanical scenarios, the potential of the present invention can be applied most profitably. Such embodiments are however not limited to time-series. The set of vibration measurement values may as well comprise envelope time series, which can also be transformed according to rotor rotational speed.

The method may be further embodied in that calculating a frequency spectrum of the set of vibration measurement values comprises calculating an auto-spectrum.

In an embodiment, selecting at least one first quefrency in the cepstrum comprises selecting a quefrency that is characteristic for a monitored machinery component. Thus, the status of one, or a plurality of components, each with an individual characteristic quefrency, can be detected in a highly specific manner.

Generally, the method may be embodied to further comprise the step of further selecting at least one second quefrency that lies in a specified quefrency interval around the selected first quefrency. In an embodiment, the entire specified quefrency interval may be selected. Thus, the system is made more tolerant of small variations of the vibration frequency of the component in question. This can be done for all components.

In an embodiment, detecting the alarm condition based upon the amplitude of the cepstrum at the selected quefrency comprises the step of converting the amplitude to an indicator value. This indicator value facilitates further evaluation and can be based on a mean value of amplitudes, a rms value (root mean square value, or a peak value. Further, the indicator value can be calculated in the frequency domain, e.g. as the power of the harmonics which form the basis for the indicated quefrency, thus providing for more accurate results.

A person skilled in the art will appreciate that if an entire que frequency interval is selected as mentioned above all the amplitudes of the quefrencies in the entire specified interval can be converted to an indicator value.

Moreover, the method may be embodied to comprise the step of selecting at least one threshold value corresponding to the selected quefrency.

In such an embodiment, detecting the alarm condition may comprise comparing the amplitude of the cepstrum at the selected quefrency with the corresponding threshold value. In embodiments wherein an indicator value is calculated from one or a set of amplitudes, detecting the alarm condition may comprise comparing the indicator value of the cepstrum at the selected quefrency with the corresponding threshold value.

Further, detecting the alarm condition may comprise selecting and evaluating an alarm rule expression from a repository of alarm rules, said alarm rule specifying an alarm condition depending on the amplitude of the cepstrum at the selected quefrency and/or on the indicator value of the cepstrum at the selected quefrency. Thus, alarm conditions can be implemented in a very flexible manner. Further, the system can be customized or updated during the run-time of the wind turbine.

The invention according to the claims proposes a monitoring apparatus for vibration-based automatic condition monitoring of a wind turbine, comprising a processing unit and an alarm condition evaluator, wherein the processing unit is configured to obtain a set of vibration measurement values of the wind turbine; the processing unit is further configured to calculate a frequency spectrum of the set of vibration measurement values; the processing unit is further configured to calculate a cepstrum of the frequency spectrum, and the alarm condition evaluator is configured to select at least one first quefrency in the cepstrum and to detect an alarm condition based upon an amplitude of the cepstrum at the selected quefrency.

Generally, the monitoring apparatus is designed to perform the methods steps of present invention, and consequently, may be embodied as defined in the dependent claims, and as described and explained above and in the detailed description, so that the monitoring apparatus is enabled to produce corresponding technical results.

In an embodiment, the processing unit is further configured to obtain at least one rotor speed value of the wind turbine and to transform the set of vibration measurement values according to the rotor speed value.

The set of vibration measurement values may comprise measurement values of vibrations of at least one gear of the monitored wind turbine and/or measurement values of vibrations of a gearbox of the monitored wind turbine. The set of vibration measurement values may be embodied to comprise a time series of vibration measurement values or an envelope time series as already mentioned.

The processing unit may be configured to calculate the frequency spectrum of the set of vibration measurement values based on calculating an auto-spectrum.

In embodiments of the apparatus, the alarm condition evaluator can be configured to select the at least one first quefrency in the cepstrum based on selecting a quefrency that is characteristic for a monitored machinery component, and can also be configured to further select at least one second quefrency that lies in a specified quefrency interval around the selected first quefrency.

In an embodiment, the alarm condition evaluator is configured to convert the amplitude to an indicator value.

The monitoring apparatus can be further embodied such that the alarm condition evaluator is configured to obtain at least one threshold value corresponding to the selected quefrency, and/or to compare the amplitude of the cepstrum at the selected quefrency with the corresponding threshold value.

In an embodiment, the alarm condition evaluator is configured to obtain and evaluate an alarm rule expression from a repository of alarm rules, said alarm rule specifying an alarm condition depending on the amplitude of the cepstrum at the selected quefrency.

The invention according to the claims proposes a wind turbine comprising a monitoring apparatus according to the present invention or one of its embodiments.

BRIEF DESCRIPTION OF THE DRAWINGS

The invention and its embodiments are explained in more detail below, using the following figures:

FIG. 1 shows a schematic overview of a first embodiment of the method of present invention;

FIG. 2 shows a detail of the method shown in FIG. 1;

DETAILED DESCRIPTION OF INVENTION

Figure 3:
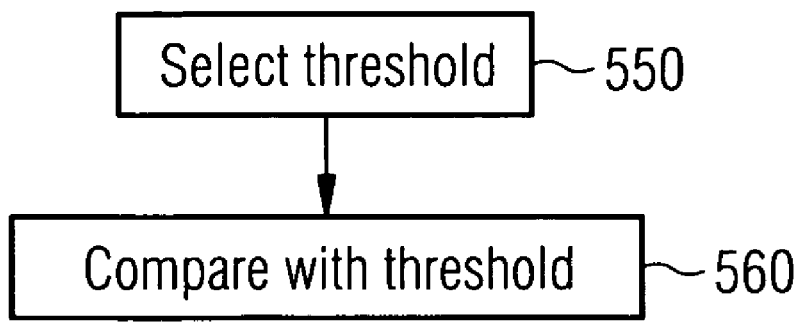
FIG. 3 shows a detail of the method shown in FIG. 2.

FIG. 1 shows a schematic overview of a first embodiment of the method of present invention. In step 100, a time series of vibration measurement values is obtained by receiving appropriate measurements from sensor systems located at or within the gearbox of a wind turbine.

While other embodiments may relate to wind turbines of constant rotor speed and thus may omit the following steps 110 and 120, in the present embodiment, the wind turbine is of variable rotor speed and its rotor speed is manipulated by a control system through braking or pitch control. In step 110, consequently, the rotor speed values corresponding to the vibration time series or, as a further possibility, to an envelope time series, is obtained, either by direct measurement with dedicated sensor systems or by receiving the measurement values from the control system. Then, in step 120, the time series of vibration measurements is transformed (scaled at the time domain) according to the variations in the rotor speed, so that the resulting transformed time series can be used in the remaining processing without alterations in the signal analysis and detection procedures. Such transformation may be based on resampling of the time-series in sync with precise data of the rotor rotational speed. For obtaining such data, a rotational speed profile can be produced by continuous measurements.

In step 200, an auto-spectrum is calculated for the transformed time series to efficiently obtain a frequency spectrum of the vibrations. In step 300, the cepstrum is calculated for the frequency spectrum thus obtained.

The cepstrum to be calculated can, for instance, be the power cepstrum $C_{pxx}$, being defined as the square of the modulus of the forward Fourier Transform F of the logarithm of the power spectrum $C_{pxx}(\omega)$ of a signal $\omega$.

$$C_{pxx}(\tau)=|F\{\log_{10} G_{xx}(\omega)\}|^2$$

Alternatively, the complex cepstrum can be used, being defined as the inverse Fourier Transform $F^{-1}$ of the logarithm of the forward Fourier Transform F of a time signal x(t)

$$C_{cxx}(\tau)=F^{-1}\{\log_{10} F\{x(t)\}\}$$

The independent variable $\tau$ of the resulting cepstrum is referred to as quefrency throughout the present application. Generally, the dimension of the quefrency is identical to the dimension of the independent variable of the analysed signal. Since, in the present case, the independent variable of the vibration signals is time, the quefrency appearing in this patent application is a measure of time.

Prior to calculating the cepstrum, one or more of the following operations may further be performed: a) Discarding frequency components outside the relevant frequency interval; b) Smoothing the edges of the cut with a smoothing function (cosine taper); and/or c) enhance robustness by limiting outliers and undesired disturbances, caused by singularities or very low-level components.

In step 400, a number of specific quefrencies are selected and continuously monitored to include various mechanical components in the wind turbine. In order to make the system more tolerant of small frequency variations of component vibration, in step 410, neighboring quefrencies are selected for each of the specific quefrencies, from a specified interval around the respective specific quefrency.

In step 500, the cepstrum is evaluated at the selected quefrencies to detect alarm conditions.

One embodiment of alarm detection is detailed in FIG. 2. In step 510, the amplitudes at the selected quefrencies in the cepstrum are determined. To facilitate further processing in alarm detection, the amplitudes at the selected quefrencies are converted to indicator values in step 520. In step 530, an alarm rule is selected from a repository of alarm rules, the rules being expressed in a formal language and expressing conditions which represent states and combinations of monitored quefrencies that are characteristic for alarm situations. In step 540, such an alarm rule is evaluated to obtain a specific monitoring result at the given point of time.

FIG. 3 shows an example for a particular alarm rule and the process of evaluation. In the given case, an alarm rule having been selected in step 530 specifies that an alarm condition is given if a particular amplitude at a particular quefrency exceeds a specific reference value. In step 550, consequently, the respective threshold value is selected from a repository to serve as the reference value, and in step 560, the indicator value obtained in step 520 (or the actual amplitude value determined in step 510) is compared with the threshold value. If the condition given in the selected alarm rule is satisfied, an alarm is detected.

Figure 4:
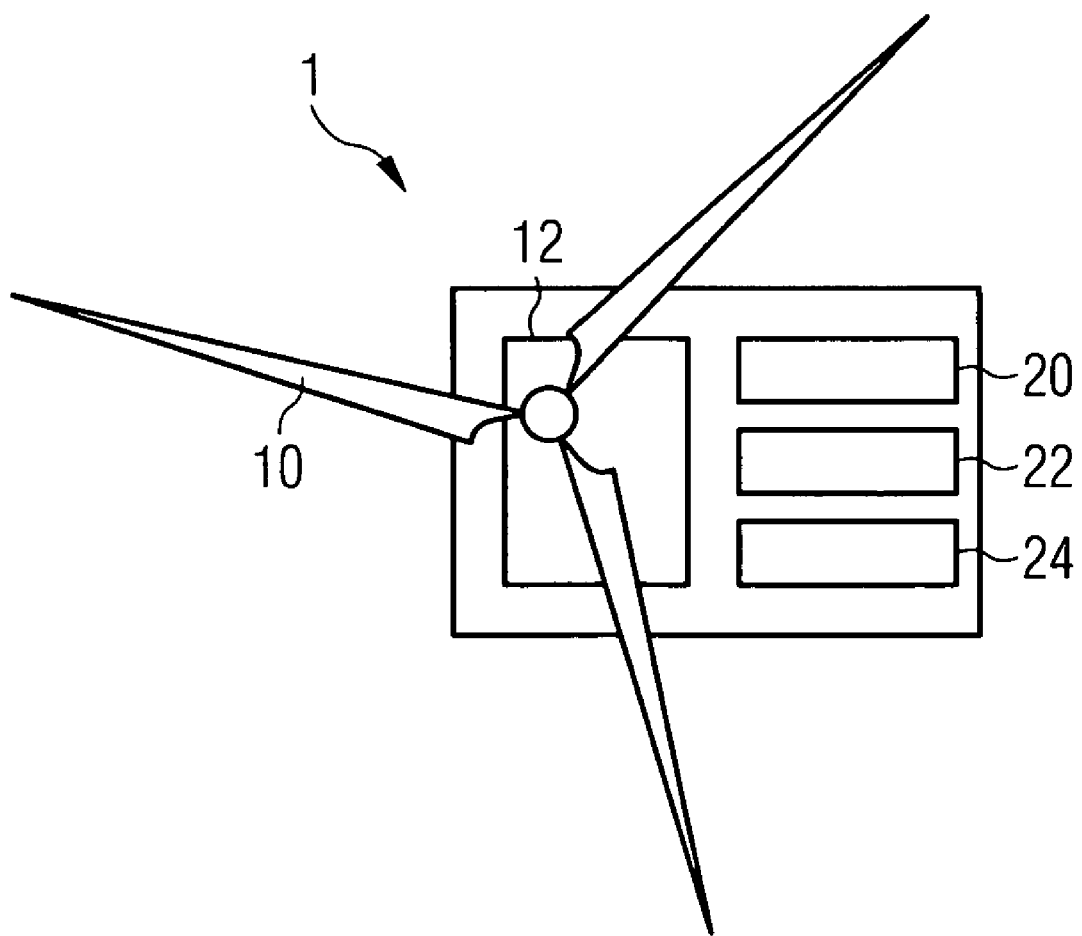
FIG. 4 shows a schematic overview of a wind turbine comprising the apparatus according to an embodiment of the present invention.

FIG. 4 shows a schematic overview of a wind turbine comprising the apparatus according to an embodiment of the present invention.

Wind turbine 1 comprises a rotor 10 that rotates with constant or variable rotor speed, as well as a gearbox 12, processing unit 20, alarm condition evaluator 22, and alarm rule repository 24. Processing unit 20, for instance a universal-purpose processor, digital signal processor, or ASIC, alarm condition evaluator 22, and alarm rule repository 24 are part of the monitoring apparatus and are configured to execute, in combination, the method as presented in the described embodiment of the invention.

Gearbox 12 comprises a number of planet stages with planet wheels, as well as sensor equipment for measuring vibration and rotor speed. Processing unit 20 is configured to perform the various signal calculation steps and to receive, store, and send information between other components of the system. Alarm condition evaluator 22 is configured to retrieve, and interpret alarm rule expressions in a formal language as well as evaluate threshold values, and is configured to communicate with an interface or further computer systems. Alarm rule repository 24 stores and provides alarm rules and threshold values to alarm condition evaluator 22.

Further, the monitoring apparatus may comprise a data acquisition unit for vibration channels in sync with the rotor rotational speed.

Figure 5:
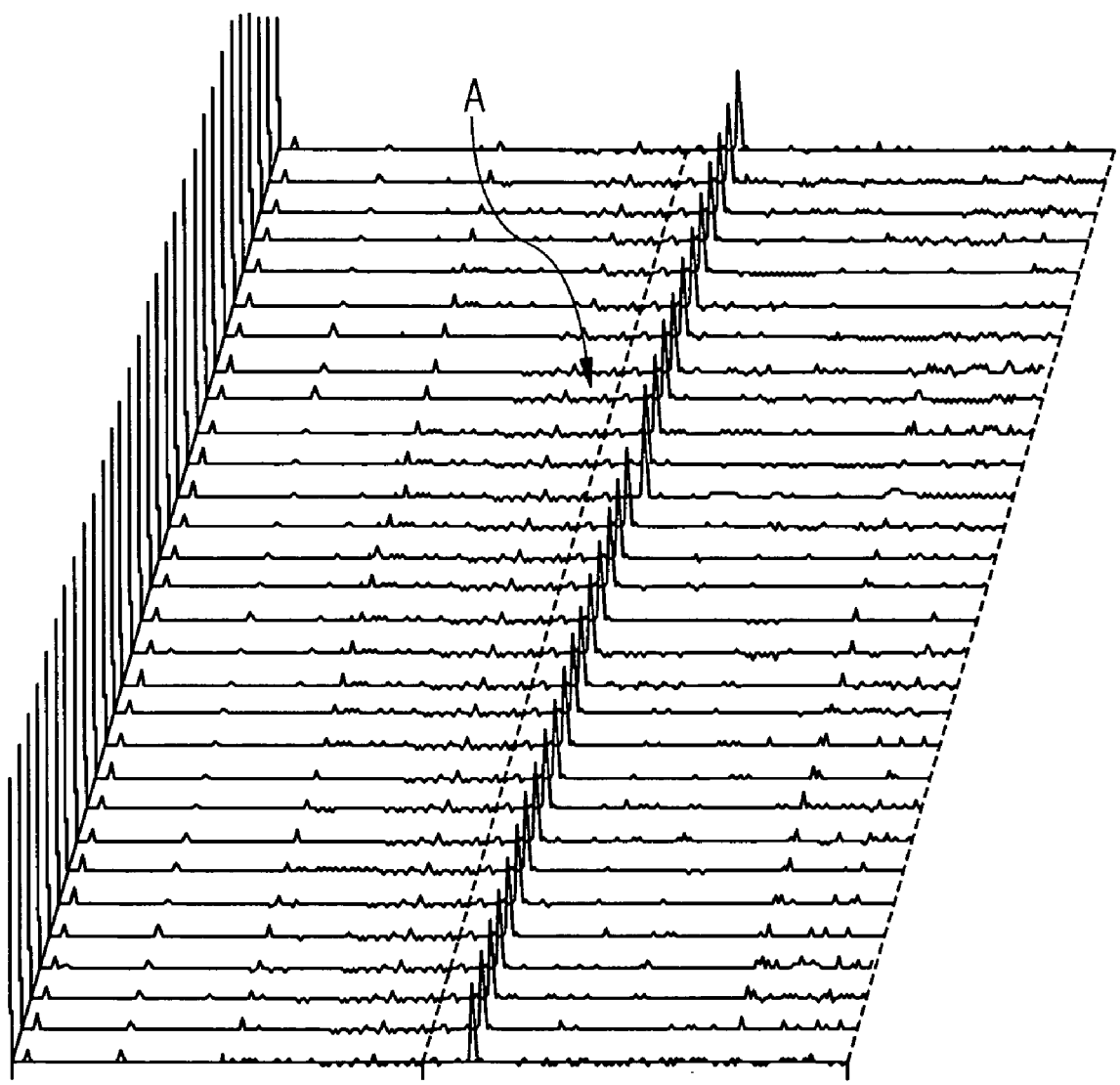
FIG. 5 shows a diagram with a series of frequency spectra.

FIG. 5 shows a waterfall plot of frequency spectra over a time period of three months. Where indicated by A, a tooth damage of a planet wheel in the gearbox of the wind turbine produces only small sidebands. However, this vital information about the tooth damage is buried under the common background noise, which is of about the same level as the vibrations from the tooth damage. Thus, such a situation is particularly difficult to detect.

Figure 6:
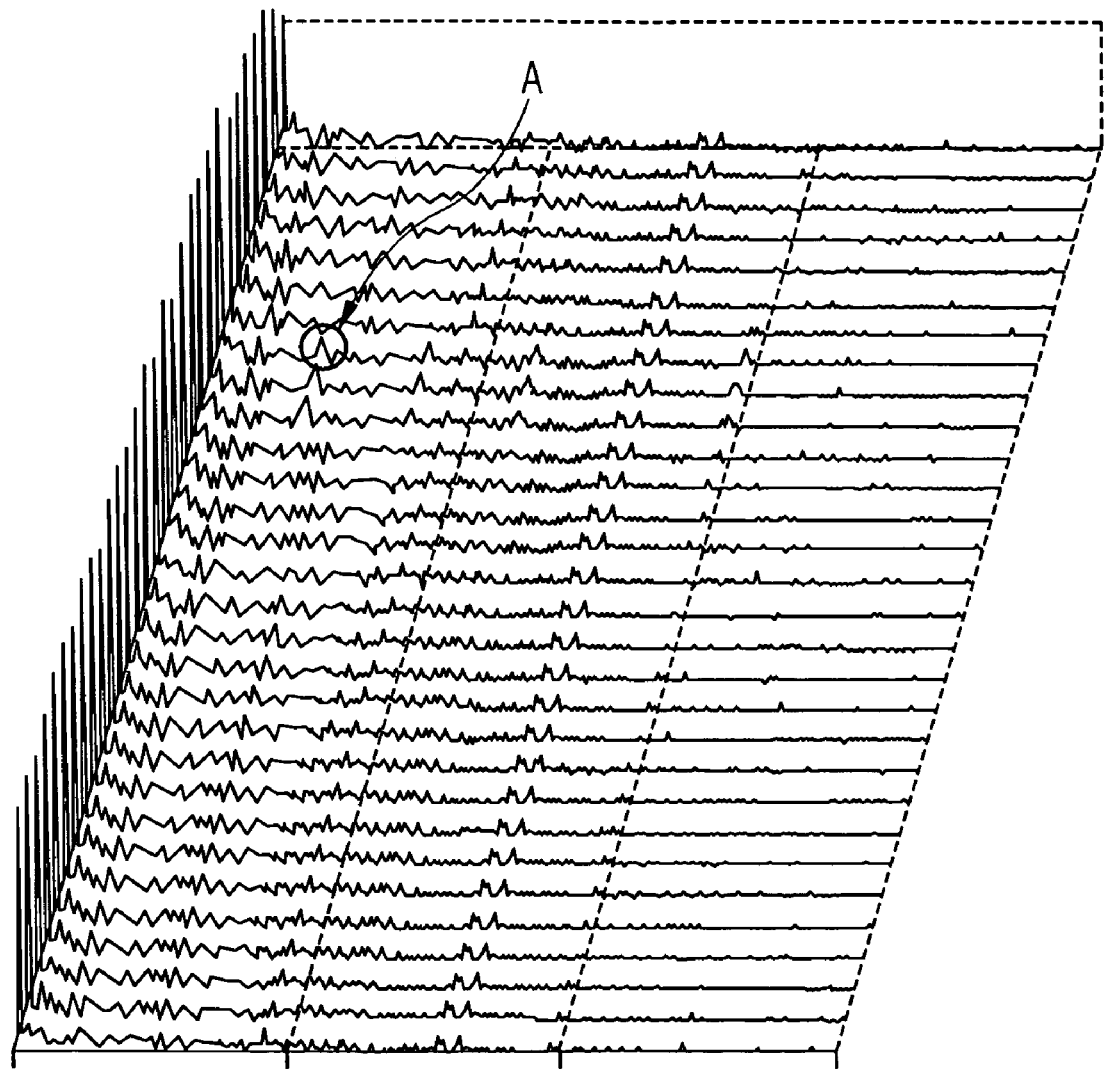
FIG. 6 shows a diagram with a series of cepstra corresponding to FIG. 5.

FIG. 6, in contrast, shows a waterfall plot of the corresponding cepstra. The rather small sidebands indicated in the frequency spectrum FIG. 5 cause clear quefrency peaks in the corresponding region of the cepstrum, as indicated by A.

Figure 7:
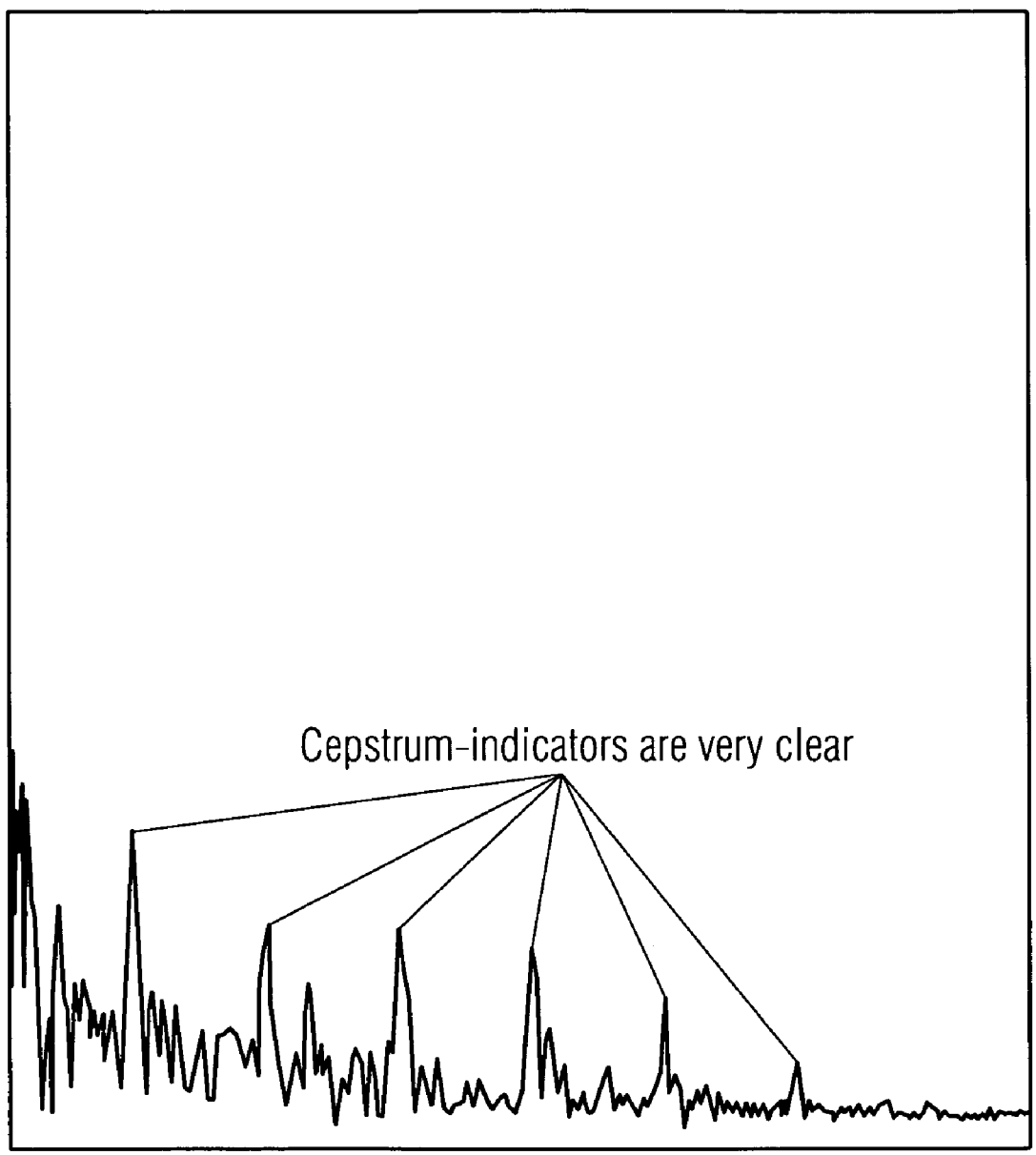
FIG. 7 shows a detail of FIG. 6

FIG. 7, shows one of the cepstra of the waterfall in FIG. 6, just before the wind turbine was stopped for repair. Here, the fundamental quefrency at 0.04 Hz−1 are clearly visible, as well as the related rhamonics. The reciprocal value of this fundamental quefrency equals to 25 Hz, which is the sideband spacing in the FFT-spectra.

In practical implementations, the presented method typically spans analysis of 30-seconds time-series. Thus, sufficient frequency resolution and a proper auto-spectrum estimate are obtained, both being a challenge in many sampled systems. Practical implementations should also provide for sufficient dynamic range to be able to represent the significant components whose signals are typically weaker than the gear meshing components by orders of magnitude. A dynamic of greater than 90 dB may be necessary.

Analyzed signals typically comprise deterministic and stochastic signal components. In order to obtain a proper auto-spectrum estimate, a sufficient number of averages should be selected. This is particularly important when the relevant deterministic components are of the same order of magnitude as the stochastic noise components, as presently the case (shown in the figures).

Thus, it can be seen that the present system provides for highly accurate vibration-based condition monitoring with improved reliability and high specificity. Particularly for mechanical components of wind turbines, the system delivers the desired results. Detection is based not only on the size of an amplitude, but also based on signature analysis, that is, based on significant amplitudes above the noise floor and the presence of rhamonics.

The invention claimed is:

1. A method for vibration-based automatic condition monitoring of a wind turbine, comprising:
   determining a set of vibration measurement values of the wind turbine;
   calculating a frequency spectrum of the set of vibration measurement values;
   calculating a cepstrum of the frequency spectrum;
   selecting at least one first quefrency in the cepstrum; and
   detecting an alarm condition based upon an amplitude of the cepstrum at the selected quefrency.

2. The method according to claim 1, wherein the monitored wind turbine is of variable rotor speed and the method further comprises:
   determining the rotor speed of the wind turbine; and
   transforming the set of vibration measurement values according to the determined speed.

3. The method according to claim 2, wherein the set of vibration measurement values of the wind turbine comprise measurement values of vibrations of at least one gear of the wind turbine.

4. The method according to claim 3, wherein the set of vibration measurement values of the wind turbine comprise measurement values of vibrations of a gearbox of the wind turbine.

5. The method according to claim 4, wherein the set of vibration measurement values comprises a time series or an envelope time series of vibration measurement values.

6. The method according to claim 5, wherein calculating a frequency spectrum of the set of vibration measurement values comprises calculating an auto-spectrum.

7. The method according to claim 6, wherein selecting at least one first quefrency in the cepstrum comprises selecting a quefrency that is characteristic for a monitored machinery component.

8. The method according to claim 7, further comprising the step of further selecting at least one second quefrency that lies in a specified quefrency interval around the selected first quefrency.

9. The method according to claim 8, wherein detecting the alarm condition based upon the amplitude of the cepstrum at the selected quefrency comprises the step of converting the amplitude to an indicator value.

10. The method according to claim 9, wherein the indicator value is based on a mean value, a RMS value, or a peak value of the amplitude of the cepstrum at the selected quefrency or quefrencies.

11. The method according to claim 10, further comprising selecting at least one threshold value corresponding to the selected quefrency.

12. The method according to claim 11, wherein detecting the alarm condition comprises comparing the amplitude of the cepstrum at the selected quefrency with the corresponding threshold value.

13. The method according to claim 12, wherein detecting the alarm condition comprises selecting and evaluating an alarm rule expression from a repository of alarm rules, the alarm rule specifying an alarm condition depending on the amplitude of the cepstrum at the selected quefrency.

14. A monitoring apparatus for vibration-based automatic condition monitoring of a wind turbine, comprising:
   a processing unit configured to
      obtain a set of vibration measurement values of the wind turbine
      calculate a frequency spectrum of the set of vibration measurement values, and
      calculate a cepstrum of the frequency spectrum; and
   an alarm condition evaluator configured to select at least one first quefrency in the cepstrum and to detect an alarm condition based upon an amplitude of the cepstrum at the selected quefrency.

15. The monitoring apparatus according to claim 14, wherein the processing unit is further configured to obtain at least one rotor speed value of the wind turbine and to transform the set of vibration measurement values according to the rotor speed value.

16. The monitoring apparatus according to claim 15, wherein the set of vibration measurement values comprise measurement values of vibrations of at least one gear of the monitored wind turbine.

17. The monitoring apparatus according to claims 16, wherein the set of vibration measurement values comprise measurement values of vibrations of a gearbox of the monitored wind turbine.

18. The monitoring apparatus according to claims 17, wherein the set of vibration measurement values comprises a time series or an envelope time series of vibration measurement values.

19. The monitoring apparatus according to claim 18, wherein the processing unit is configured to calculate the frequency spectrum of the set of vibration measurement values based on calculating an auto-spectrum.

20. The monitoring apparatus according to claim 19, wherein the alarm condition evaluator is configured to select the at least one first quefrency in the cepstrum based on selecting a quefrency that is characteristic for a monitored machinery component.

* * * * *